(12) United States Patent
Garrity et al.

(10) Patent No.: US 11,265,688 B2
(45) Date of Patent: Mar. 1, 2022

(54) SYSTEMS AND METHODS FOR ANOMALY DETECTION AND SURVIVAL ANALYSIS FOR PHYSICAL ASSETS

(71) Applicant: Tagup, Inc., Somerville, MA (US)

(72) Inventors: Jonathan Garrity, Boston, MA (US); William Vega-Brown, Cambridge, MA (US)

(73) Assignee: Tagup, Inc., Somerville, MA (US)

( * ) Notice: Subject to any disclaimer, the term of this patent is extended or adjusted under 35 U.S.C. 154(b) by 96 days.

(21) Appl. No.: 16/566,384

(22) Filed: Sep. 10, 2019

(65) Prior Publication Data

US 2020/0084601 A1 Mar. 12, 2020

Related U.S. Application Data

(60) Provisional application No. 62/729,193, filed on Sep. 10, 2018.

(51) Int. Cl.
| | | |
|---|---|---|
| *G06Q 30/00* | (2012.01) | |
| *H04W 4/35* | (2018.01) | |
| *G06Q 10/08* | (2012.01) | |
| *H04W 4/38* | (2018.01) | |

(52) U.S. Cl.
CPC ............ *H04W 4/35* (2018.02); *G06Q 10/087* (2013.01); *H04W 4/38* (2018.02)

(58) Field of Classification Search
CPC ......... H04W 4/35; H04W 4/38; G06Q 10/087
USPC ....................................... 235/385, 380, 375
See application file for complete search history.

(56) References Cited

U.S. PATENT DOCUMENTS

| | | | | |
|---|---|---|---|---|
| 5,926,800 | A * | 7/1999 | Baronowski | G06Q 40/08 705/35 |
| 9,744,978 | B2 * | 8/2017 | Bhattacharjya | B61L 23/044 |
| 2011/0270779 | A1* | 11/2011 | Showalter | G06Q 40/06 705/36 R |
| 2015/0242577 | A1* | 8/2015 | Konoske | G16H 50/50 705/2 |
| 2017/0344411 | A1* | 11/2017 | Lee | G06F 11/008 |
| 2018/0124097 | A1* | 5/2018 | Tiwari | H04L 63/1425 |
| 2018/0190395 | A1* | 7/2018 | Clarkson | G05B 9/03 |
| 2021/0065086 | A1* | 3/2021 | Lee | G06F 11/079 |

OTHER PUBLICATIONS

Regression Models and Life-Tables; Journal of the Royal Statistical Society, Series B (Methodological), vol. 34, No. 2, by D.R. Cox, pp. 187-220; (1972).

Time-Dependent Covariates in The Cox Proportional-Hazards Regression Model; Department of Biostatics, University of Washington, Seattle, Washington; by Lloyd D. Fisher and D.Y. Lin, pp. 145-157 (1999).

(Continued)

*Primary Examiner* — Thien M Le
(74) *Attorney, Agent, or Firm* — BakerHostetler

(57) ABSTRACT

Systems and methods are provided to predict failure probabilities and estimate remaining useful life in real time for physical assets such as systems or devices in a distributed fleet. Systems and methods generate models that can be used to create hazard functions based on sensor data, create survival functions based on hazard functions, and calculate variables (e.g., remaining life, time of failure) for one or more assets based on the survival functions.

20 Claims, 9 Drawing Sheets

(56) References Cited

OTHER PUBLICATIONS

Ridge Regression: Biased Estimation for Nonorthogonal Problems; Technometrics, vol. 12, No., pp. 55-67, by Arthur E. Hoerl and Robert W. Kennard (Feb. 1970).
Stochastic Models for Degradation-Based Reliability IIE Transactions, by Jeffrey P. Kharoufeh and Steven M. Cox, 37:6, pp. 533-542, (Feb. 23, 2007).
Degradation Modeling Applied to Residual Lifetime Prediction Using Functional Data Analysis; The Annals of Applied Statistics, by Rensheng R. Zhou, Nicoleta Serban and Nagi Gebraeel, vol. 5, No. 2B, pp. 1586-1610 (Jun. 2011).
Algorithm 778: L-BFGS-B: Fortran Subroutines for Large-Scale Bound-Constrained Optimization, by Ciyou Zhu, Richard H. Byrd, Peihuang Lu, and Jorge Nocedal; ACM Transactions on Mathematical Software, vol. 223, No. 4, pp. 550-560 (Dec. 1997).
Real-Time Anomaly Detection for Streaming Analytics by Subutai Ahmad and Scott Purdy; arXiv:1607.02480v1 [cs.AI], (Jul. 8, 2016).
Automatic Outlier Detection for Time Series: An Application to Sensor Data; Knowledge and Information Systems by Sabyasachi Basu and Martin Meckesheimer; The Boeing Math Group (Aug. 22, 2006).

\* cited by examiner

SYSTEMS AND METHODS FOR ANOMALY DETECTION AND SURVIVAL ANALYSIS FOR PHYSICAL ASSETS

CROSS-REFERENCE TO RELATED APPLICATION

This application claims the benefit of and priority to U.S. Provisional Appl. No. 62/729,193, filed Sep. 10, 2018, the entirety of which is incorporated herein by reference.

TECHNICAL FIELD

The subject matter of this disclosure generally relates to monitoring physical assets, and more particularly describes unconventional techniques for collecting sensor data from physical assets, predicting failure probabilities, and estimating remaining useful life of the physical assets.

BACKGROUND

Companies and governmental entities maintain massive fleets of physical assets supporting their services. Such physical assets can include utility equipment such as electrical transformers, switches, breakers, batteries, water filtration systems, boilers, et cetera. While the physical assets used by public utilities and private enterprise are generally reliable, unexpected and sometimes catastrophic failures are nearly unavoidable in the current technological environment. Such failures are expensive in terms of downtime, manpower, and equipment costs, and can expose organizations to undesirable liability.

Better understanding when or how an asset will fail creates business value across many asset classes. Preemptive maintenance or removal can reduce in-service failures, avoiding unplanned downtime, premature asset loss, negative safety impact, collateral damage, and negative secondary or tertiary effects (e.g., lawsuits, customer loss). On the other hand, accurate estimates of remaining useful life prevent premature replacement of an asset, reducing amortized capital expenses. Estimating failure probabilities allows for optimized field force strategies, providing a higher "reliability return" for each inspection. Still further, understanding what assets will fail in an upcoming budget cycle ensures adequate lead time for replacement, enhancing inventory management and procurement.

Existing strategies for preventing in-service failures rely heavily on arbitrary and inconsistent operator judgment and ad hoc heuristic estimates. Common strategies rely on employee review of operating data, inspection reports, and common asset data such as manufacturing and installation dates. Even cursory manual data review is labor-intensive given that large companies and public utilities possess tens of thousands of similar physical assets, and more complex review exceeds the capabilities of human operators. Employees may lack time or training (to say nothing of limited human faculties for calculation and large databases) to analyze each asset as an individual system subject to unique usage and environmental factors, instead relying on threshold alarms to prioritize asset action like inspection, service, or replacement. Threshold alarms can be used to preemptively flag assets for removal if, e.g., a material level exceeds a target amount or rates of parameter change are outside a preferred range. Defining these thresholds is challenging: if the thresholds are set too narrowly, critical issues will go unexamined. If they are set too broadly, employees will be unable to investigate the voluminous number of alarms. Further, acceptable operating ranges (as defined by a manufacturer or installer, or determined through use or analysis) for an aging or heavily-taxed asset in a severe environment may vary significantly in comparison with acceptable operating ranges for a new or less-stressed asset.

To make decisions to inspect, repair, or replace an asset, routine techniques rely on heuristics derived and tracked using the subjective judgments of involved parties. Some techniques seek to capture employee knowledge and standardize judgment by coding asset health indices (AHI). AHIs are linear combinations of observables, often scaled as a percentage. AHIs, while useful for rank ordering assets for replacement or inspection, are difficult to interpret. For example, what does it mean to be 85% healthy? Is the unhealthy 15% something critical or exceptionally sensitive? Does the percentage degradation correspond to service life or maintenance costs? These questions cannot be definitely answered as there is no established AHI standard or consistency in definition and collection/entry, and relation between any given AHI and failure probability is unclear.

Because techniques for consistent data collection and analysis do not provide clear information about physical asset state and performance, it would benefit physical asset owners to receive more accurate and informative details on the performance and failure risk of their assets.

SUMMARY

In an embodiment, a method comprises accessing sensor data related to a plurality of physical assets, generating a hazard function associated with at least one of the plurality of physical assets based on the sensor data, generating a survival function based on the hazard function, and calculating a variable associated with the at least one of the plurality of physical assets based on the survival function.

In an embodiment, a system comprises a hazard module configured to generate a hazard function associated with a physical asset based on sensor data from the physical asset, a survival module configured to generate a survival function based on the hazard function, and an analytics module configured to calculate a variable associated with at least one of the physical asset based on the survival function.

In an embodiment, a non-transitory computer-readable medium stores instructions that when executed by a processor effectuate operations comprising: accessing sensor data related to at least one physical asset, generating a hazard function associated with the physical asset based on the sensor data, generating a survival function associated with the physical asset based on the hazard function, and calculating a variable associated with the physical asset based on the survival function.

Additional and alternative aspects will be apparent on review of other portions of this disclosure.

BRIEF DESCRIPTION

So that those having ordinary skill in the art, to which the present disclosure pertains, will more readily understand how to employ the novel system and methods of the present disclosure, certain illustrated embodiments thereof will be described in detail herein-below with reference to the drawings, wherein.

DETAILED DESCRIPTION

Aspects herein generally relate to unconventional sensor capabilities and analysis to collect real-time data on physical assets and analyze them individually and collectively for actionable survival information. Data can be collected and modeled, and based on models a hazard function and survival function can be generated to explain past phenomena and predict future performance of assets.

Embodiments can utilize novel convex latent variable modeling, to model both phenomena that lead to an instantaneous increase in the risk of failure (e.g., overloading or other transient factors) and phenomena that degrade the long-term health of the asset (e.g., corrosion or other persistent factors). As suggested, a convex latent variable model can employ uncommon machine learning techniques to find a best set of parameters to model a set of data, in this instance separating transient and latent factors discernible from sensor data. In alternative or complementary embodiments, other modeling techniques can be utilized to model sensor data before generating a hazard function. Sensor data herein can include various data collected by sensors, categories or types of which can be described as sensor variables.

Calculations described herein can derive measures of asset health superior to routine AHIs to produce principled, interpretable, and verifiable estimates of useful quantities like remaining useful life or probability of survival until some future time. Unlike conventional health indices, analytics disclosed herein improve through the continuous, ongoing, and real-time collection of additional asset data. Ongoing training based on current data enables discovery of connections and patterns beyond prior capabilities. The solutions of this disclosure provide practical applications of novel data collection and model techniques to provide actionable and previously unavailable insights regarding fleets and individual assets.

Figure 1:
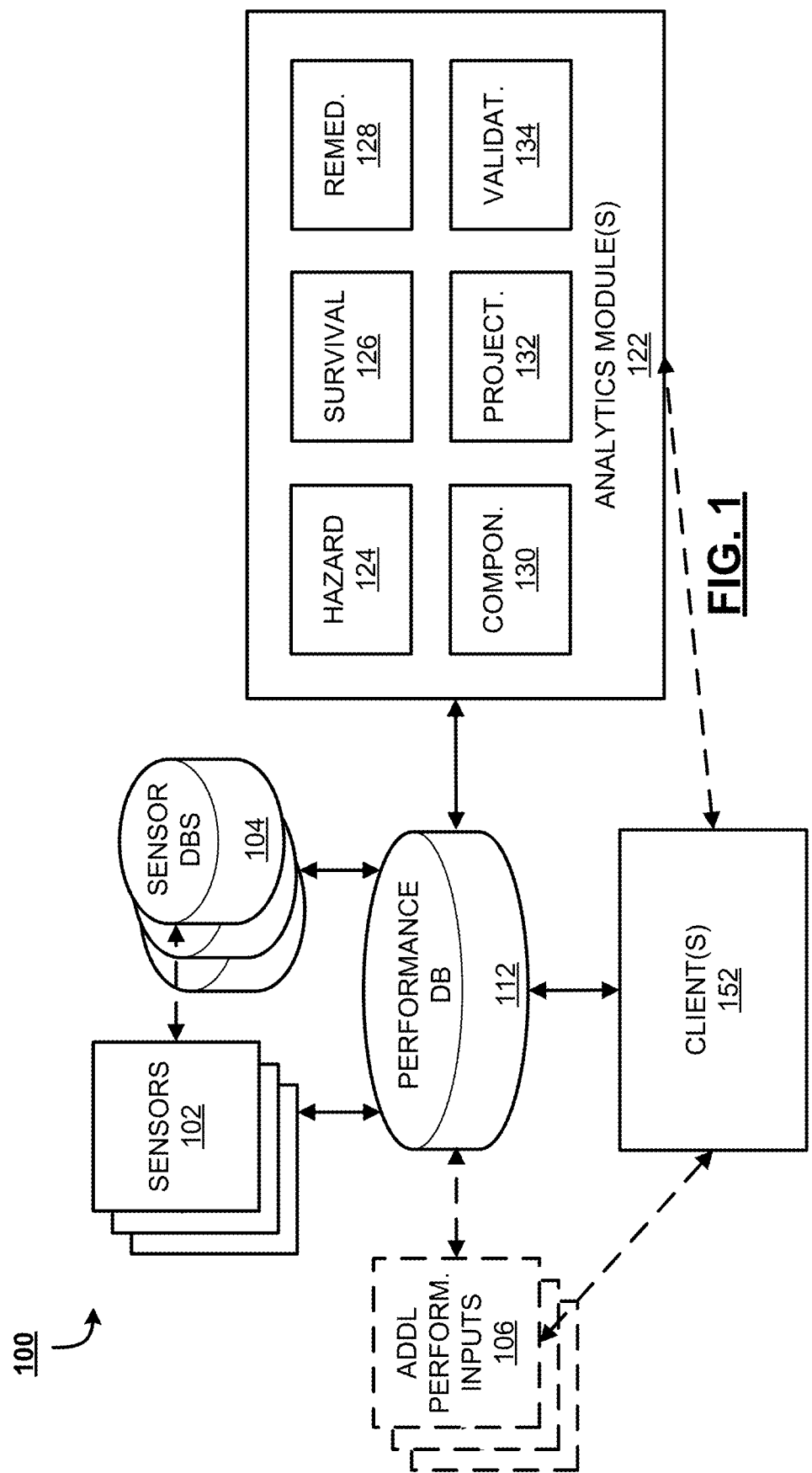
FIG. 1 illustrates a block diagram of an example system of the disclosure.

FIG. 1 illustrates an example system 100 for determining a variable related to one or more physical assets based on modeling. As described herein, models can include survival functions or other functions determining degradation of or risk to physical assets in a manner permitting proactive maintenance or action, or forecasting of needs and costs. System 100 includes sensors 102, one or more of which can be associated with one or more physical assets in any combination (e.g., one sensor to one physical asset, two or more sensors to one physical asset, one sensor to two or more physical assets, different combination for different types of sensors or physical assets). Sensors 102 collect data regarding the physical assets. Sensor data from sensors 102 can be provided to one or more of sensor databases 104 and/or performance database 112. As suggested, sensor databases 104 can be one or more databases containing sensor data about one or more assets being modeled, and performance database 112 can be one or more databases storing one or more sensor data, performance data, or environmental data or context relating to one or more physical assets.

Performance database 112 includes sensor data as well as processed sensor data and information developed using analytics module(s) 122 as described herein. Performance database 112 can receive sensor data from sensor databases 104, which can store preexisting sensor data to develop models or perform other actions in the absence of real-time or other data from sensors 102. Performance database can alternatively or complementarily receive sensor data directly from sensors 102 (or other sources) to develop a database of sensor data for use as described herein.

Performance database 112 may also receive information from additional performance inputs 106. These can include, but are not limited to, manual input from users (e.g., technicians, inspectors, or other personnel who locally or remotely access and assess the performance or condition of a physical asset), the devices themselves, systems interacting therewith or disposed therebetween, et cetera. In embodiments, additional performance inputs can be received from clients 152, or through a user interface associated with clients 152.

Sensor databases 104 and/or performance database 112 can also receive data through various other interfaces, such as, e.g., application programming interfaces (APIs). Similarly, sensor databases 104 and/or performance database 112 can include APIs to allow other elements of system 100 to access data therein, or other elements of system 100 can include or leverage a separately-implemented APIs configured to access data therein.

Clients 152 can view or receive information from performance database 112 and, in embodiments, analytics modules 122. Such information can include but is not limited to sensor readings and data as well as variables related to physical assets calculated from models derived from sensor data and stored in performance database 112 and/or calculated using analytics module 122. In embodiments, clients 152 may also provide information to performance database 112.

Analytics module 122 can determine any number of variables which can be calculated using models developed from sensor data. In an embodiment, survival functions can be generated for use calculating predictions of failure risk. These predictions can be based on, e.g., statistical calculation or other techniques.

In certain embodiments, analytics module 122 can calculate or predict the risk of failure across a fleet of physical assets. If physical asset n was installed at date $t_{i,n}$ and failed at date $t_{f,n}$, it had a lifetime $T_n = t_{f,n} - t_{i,n}$. The objective of survival analysis is to understand the distribution over the lifetime(s) of a physical asset(s) (or type(s) of physical asset(s)), given static asset data (e.g., physical asset rating, manufacturer) as well as dynamic operational data (e.g., asset temperature, environmental temperature, loading).

Analytics module 122 can develop or calculate a variety of values, parameters, projections, variables, et cetera, related to a lifetime $T_n$ of a particular physical asset n. For example, analytics module 122 can calculate an expected remaining useful life, the average age at which the physical asset is expected to fail given that it has been in service for t days: $m_n(t) = E[T_n \vee T_n > t]$. This quantity generalizes the mean time between failures by accounting for the operational history of the physical asset. Analytics module 122 can also calculate a certainty of the expected lifetime.

In alternative or complementary embodiments, analytics module 122 can calculate the probability, $Pr(t_0 < T_n < t_1 | T_n > t)$, that a particular physical asset n fails in a specific time window (i.e. between $t_0$ and $t_1$), given that it has been in service for t days. The probability metric can be used to prioritize maintenance (through automated maintenance or alarms to other systems or entities) on those physical assets most likely to fail within, e.g., the next month. Purchasing decisions and scheduling (for maintenance, orders, et cetera) can also utilize these probabilities throughout different time windows to determine an expected number or fraction of physical asset failures in, e.g., the next month, year, et cetera. In embodiments, remediation module 128 can provide recommendations for purchasing, scheduling, or other actions to remediate degradation and loss, which can be based on modeling used to create survival functions, and can further be based on various constraints relating to purchasing or scheduling (e.g., cost, availability, et cetera). In embodiments, remediation module 128 can be described as constraining a cost, but "cost" is understood to embrace not only monetary expense (direct such as the expense of a part, or indirect such as the expense of installing the part or lost productivity) but also non-monetary costs that can be quantified or estimated (time, quality of service, customer sentiment, et cetera). Analytics module 122 can further derive additional values, like the survival function, $S(t,t')=\Pr(T_n>t'\vee T_n>t)$, the probability that a physical asset remains in service for t' days given that it has survived for t days, using such probabilities or other values.

Analytics module 122 can capture these and other variables using a hazard function $\lambda_n(t)$, which describes a probability of a physical asset failing during the $t^{th}$ day of its life, given that it remained in service until day t:

$$\lambda_n(t) = \Pr(T_n = t+1 | T_n > t)$$

Formally, the hazard function is a continuous function of time $\lambda_n(t)$ representing the density of failures at time t; the probability of failure within a given time period from $t_0$ to $t_1$ is given by integrating the hazard function from $t_0$ to $t_1$. In embodiments, a discrete model as herein can be used by analytics module 122 and/or components interacting therewith or receiving data therefrom. In embodiments, the hazard function can be calculated and/or re-calculated by hazard module 124.

Analytics module 122 can derive an expected lifetime of a particular physical asset n from the hazard function:

$$m_n(t) = E[T_n | T_n > t] = \sum_{u=0}^{\infty} \exp\left(-\sum_{T=t}^{t+u} \lambda_{n,T}\right)$$

Analytics module 122 can further derive the survival function or failure probability in a given period:

$$m_n(t) = E[T_n | T_n > t] = \sum_{u=0}^{\infty} \exp\left(-\sum_{T=t}^{t+u} \lambda_{n,T}\right)$$

In fact, the hazard function $\lambda_n(t)$ as determined by analytics module 122 is sufficient to calculate any variable or value derived from the lifetime of an asset. Unlike derived statistics, the hazard function can utilize both positive information (the knowledge that a physical asset failed at age $T_n$) and negative information (the knowledge that it did not fail before time $T_n$) independently. In this manner, analytics module 122 can more clearly calculate or account for the impact of a particular time series measurement on the hazard, and thus on the remaining useful life. In embodiments, survival module 126 can derive and/or re-derive survival functions based on the hazard function(s).

Analytics module 122 can use a variety of techniques to model a hazard function. In one embodiment, analytics module 122 can assume the hazard function is constant, leading to an exponential survival function:

$$\lambda_n(t) = a$$

$$S_n(t) = \exp(-at)$$

Analytics module 122 can alternatively use parametric models as opposed to the constant-hazard model, such as Weibull or log-normal models; a Weibull model assumes the hazard is a polynomial:

$$\lambda(t, a_n, b_n) = \frac{a}{b}\left(\frac{t}{b}\right)^{a-1}$$

Which gives an implied survival distribution of:

$$S(t; a, b) = \exp\left(-\left(\frac{t}{b}\right)^a\right)$$

While parametric models are capable of estimating the distribution over lifetimes for a population of physical assets, they do not account for the idiosyncrasies of an individual physical asset, and they do not account for differences in the operating histories of individual physical assets. Information like a physical asset's manufacturer or rating is often available and this information influences the physical asset's expected lifetime.

To provide additional modeling techniques, analytics module 122 can utilize time-series data for failure analysis. Proportional hazard models can incorporate time-dependent information. This class of models is effective for estimating the hazard function and the impact of observations on short term failure risk, but does not model long-term impacts of equipment degradation because it does not incorporate past observations on the future hazard expectations. For example, a physical asset may be overloaded at time t and the model may determine that the physical asset is more likely to fail when overloaded. If the physical asset survives the overloading, the time-series data models may assume that overloading has no further impact on the expected lifetime, but this may not be true in all (or any) situations. More, repeated overloading may change the manner or magnitude of impact for expected lifetimes. Thus, as information reflecting operational history (as stored in, e.g., performance database 112 and/or sensor databases 104, and/or collected or provided by sensors 102) increases, models of failure risk should change; for example, a report of corrosion (e.g., ascertained during inspection and received from additional performance inputs 106, determined by a sensor 102) may permanently increase the risk of failure and decrease the expected lifetime. Analytics module 122 can therefore perform techniques accounting for degradation, partial damage, or other ongoing factors affecting asset failure probability.

Accordingly, various models can explicitly include degradation. Some models incorporating degradation may assume that the observed covariates have a direct relationship to degradation state, typically with additive random noise. Alternative models incorporating degradation assume that the degradation state is unobservable, but that the time-varying covariates indirectly reflect the degradation state over time. Using such models, the degradation state can be inferred.

Another alternative is the convex latent variable model, which can compute a summary of the impact of past observations. Additionally, the model can estimate instantaneous and temporary changes to the risk of failure due to recent observations. Likely parameters for convex latent variable models can be found (where they cannot be found explicitly) by solving convex optimization problems. Embodiments of analytics module 122 can utilize convex latent variable models.

The convex latent variable model is implemented using historical records for various physical assets. A unified record for physical asset n consists of a sequence $X_n = \{x_{n,t}\}$ of time series measurements (in non-limiting examples, e.g., temperature or load) in a given time period t and a vector of static features $y_n$. We can define a link function $\phi$ and a vector of m features $$\psi_1(X_n, y_n, t), \ldots, \psi_m(X_n, y_n, t)$$

to define a hazard function as:

$$\lambda(t; X_n, y_n, \theta) = \phi\left(\sum_{i=1}^{m} \theta_i \psi_i(X_n, y_n, t)\right)$$

where $\lambda_o(t)$ is a base hazard rate computed from the distribution of failure times across all units and $\theta$ represents the parameters of the model. In particular, an effective model for the hazard sets $$\psi_0(x,t) = \log(\lambda_0(t)), \psi_1(x) = x, \text{ and } \psi_2(x) = \Sigma_{t=1}^{T} x_t$$

resulting in the following hazard function:

$$\lambda(t; X_n, y_n, \theta) = \lambda_0(t)(\theta_0 \cdot y_n)\exp\left(\theta_1 + \theta_2 \cdot \int_0^t x(\tau)d\tau + \theta_3 \cdot x(t)\right)$$

In embodiments, the base hazard rate may be given by a Weibull model described above.

Analytics module 122 encodes the relationship between the observed data and the hazard rate by the parameters $\theta_0$, $\theta_1$, $\theta_2$, and $\theta_3$. The form of $\lambda(t)$ is determined by analytics module 122 (or input thereto) to allow use of modelling factors that represent both a short-term failure risk and a long-term health degradation. $\theta_1$ models the relationship between the measurements on day t and the risk of failure on day t. For example, a physical asset may be more likely to fail under heavy load than not (e.g., no heavy load present when de-energized for electrical assets). In contrast, $\theta_2$ models the relationship between failure risk on day t and all measurements prior to day t. For example, if an unexpected drop in a physical asset's oil pressure or main tank corrosion is observed on any day before day t, then the risk of failure on day t will increase.

Obtaining acceptable values for the parameters $\theta_0$, $\theta_1$, $\theta_2$, and $\theta_3$ by hand-tuning or by experiment may be ineffective as these values are not always readily interpretable. Accordingly, analytics module 122 can utilize optimization to find the most likely parameters to represent the data (e.g., sensor data for particular assets or fleets) given the collection of records $D = \{y_n, X_n, T_n\}$ to define a model. The likelihood of a set of parameters can be a probability of observing the measurements recorded, as given by:

$$\mathcal{L}(\lambda; \mathcal{D}) = \prod_n \left(\prod_{t=0}^{T-1} \exp(-\lambda(t; y_n, X_n))(1 - \exp(\lambda(T_n; y_n, X_n))\right)$$

Finding the parameters that maximize this function can be performed by analytics module 122 as an optimization problem (e.g., the objective function is shown to be log-convex) and can be solved using a variety of algorithms (e.g., gradient descent).

In embodiments, analytics module 122 can account for multiple hazard terms or components applicable to a particular asset using, e.g., component module 130. Component module 130 can determine overall hazard as a sum or product based on different hazard terms, such as a persistent degradation term (e.g., known wear or damage to a particular asset) and a transient hazard term (e.g., instantaneous overloading, weather condition, et cetera). In embodiments, such terms may be interrelated (e.g., overloading may instantaneously increase hazard by a large amount until overloading ceases and thereafter keep the hazard elevated by a lower amount based on damage resulting from overloading). A base hazard (developed by, e.g., hazard module 124) can be combined with other hazard terms by component module 130.

Analytics module 122 can account for incomplete data in performance database 112. To evaluate the hazard at time t, the model(s) of analytics module 122 require(s) access to all observations up through time t. If t is a time in the future, it is understood that performance database 112 will not include data between the current time and t. Therefore, to calculate expected remaining useful life or the probability of survival until some point in the future, survival analysis must be performed by analytics module 122 without access to future operating data.

The issue of incomplete data in performance database 112 is not limited to future operating data. Even records of the past operating history of each physical asset are often incomplete. Various causes for incomplete data include the lack of remote monitoring capability or sensors during portions of a service life, interruptions to communications, electromechanical failures, human error (e.g., inconsistent technician records or servicing), data loss or inaccessibility, et cetera. Analytics module 122 can therefore account for missing past data as well as future operating data in its modeling.

In embodiments, analytics module 122 learns a fixed and/or constant risk which replaces missing data. Models generated and utilized by analytics module 122 can thereby approximate an expected hazard for observations if or when those observations are not available. The fixed and/or constant risk value (e.g., steady state estimation assuming values representing average of all sensor or contextual data used in modeling) can be set to the average of the available observations or can be estimated as part of the optimization problem. In embodiments, a fixed and/or constant risk value can be the output of a hazard function in the absence of any new data (e.g., based on total to date with no ongoing changes). In this manner, analytics module 122 can both forecast future operating data and address incorrect or incomplete historical data.

In embodiments, projection module 132 can be utilized to fill or replace some or all missing (either missed or not yet observed) or improper data. Projection module 132 can identify express or implicit gaps in data (e.g., incomplete entry, or absence of entry altogether) or corrupted or erroneous entries based on failure to fit a model or improper values. Thereafter, projection module 132 can add or replace entries to provide datapoints for models or forecasting. In embodiments, a fixed risk value can be used to in a manner reversing risk calculations whereby fill values for variables causing the fixed risk value are calculated and used to fill gaps in data with one or more possible scenarios. In embodiments, projection module 132 can leverage a model of the data used by analytics module 122 to generate a hazard function using, e.g., hazard module 124. The model, in embodiments, may be a convex latent variable model. Other models can also be used alternative or complementarily, and multiple instances of single models can exist depending on the data available and/or setup of parameters.

In embodiments, data in performance database 112 (and/or to or from other sources) can be updated in a real-time manner. For example, sensors 102 and/or other sources can periodically or continuously provide operating data to performance database 112. Analytics module 122 can repeat some or all of the aspects disclosed herein continuously or periodically to validate or regenerate models, or recalculate variables (e.g., expected remaining useful life, failure probability), based on the increased set of data available. In embodiments, validation module 134 can validate functions or models. Validation can involve analysis of data that is "left out" or "held back" from the generation of functions or models to by validated (e.g., by hazard module 124, survival module 126, projection module 132, et cetera) to ensure the integrity of validation. Validation module 134 can access reserved data and, independently or in conjunction with other modules, determine a calibration or accuracy of outputs by assessing the correspondence between the predictions of the model to be validated and the reserved data.

Hazard and survival functions (or other variables, in alternative embodiments) calculated by analytics module 122 can be used to solve a variety of downstream problems or automate various processes. For example, an enterprise may possess a fleet of physical assets (e.g., electrical grids, communications networks) which include redundancies or at least partially provide mutual support or reinforcement for one another. Analytics module 122 can calculate a systemic failure point at which, without further action, service is impacted due to the number or nature of unserviceable assets. Dynamic loads and asset locations (physical or logical) can be factored in such that systemic failure is determined not as a fixed threshold but a changing series of contingencies. In this regard, one or more of analytics module 122, clients 152, and/or other elements of system 100 can generate or execute automated commands to take remedial action to avoid or correct systemic failures or alert entities of possible future systemic failures. In embodiments, survival module 126 can be configured to calculate or predict systemic failure points, alone or in combination with projection module 132.

In a related example, analytics module 122 can analyze survival function outputs to determine how to shift and manage loads, usage, and/or maintenance to achieve various business or economic goals. An entity can identify a business or economic priority and a corresponding schema can be applied to set alert values, provide or remove resources, or otherwise modify analytics to drive management of the physical asset fleet toward that priority. Examples of business or economic priorities include maximizing the lifespan of one or more physical assets (e.g., by shifting loads away from assets where expected lifespan is shorter), batching maintenance and/or purchasing (e.g., by shifting loads to coordinate or time maintenance needs of multiple physical assets), incur or delay costs related to physical assets (based on, e.g., fluctuating commodity prices or tax considerations), et cetera. Analytics module 122 or other aspects herein can utilize artificial intelligence or machine learning techniques to determine values for physical asset variables and perform or assist with calculation thereof, as well as identifying relevant physical asset variables or parameters influencing physical asset variables. In embodiments, remediation module 128 can determine how to shift and manage loads, usage, and/or maintenance in view of constraints such as availability, cost, systemic impact, et cetera, to manage or increase efficiency in management of fleets of interrelated assets.

While hazard module 124, survival module 126, remediation module 128, component module 130, projection module 132, validation module 134, and various other aspects are illustrated or described in conjunction with analytics module 122, it is understood that such can be implemented independently or in other arrangements providing such capabilities without departing from the scope or spirit of the disclosure.

Figure 2:
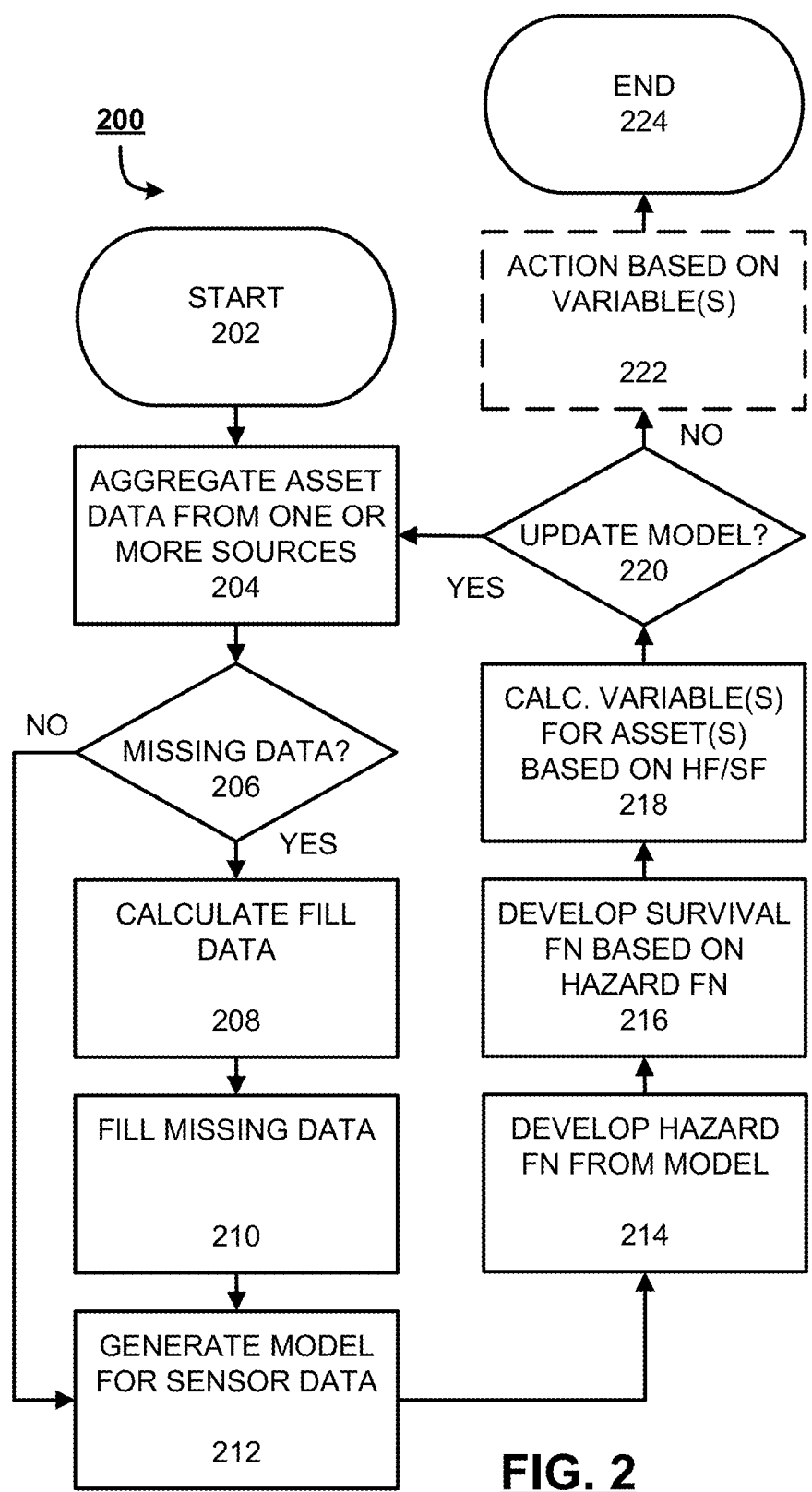
FIG. 2 illustrates a flow chart of an example methodology of the disclosure.

FIG. 2 illustrates a flowchart of an example methodology 200 disclosed herein. Methodology 200 begins at 202 and proceeds to 204 where operational data related to one or more physical assets (or classes or types of physical assets) is aggregated. Such data can be collected or received from sensors, systems, interfaces, human observation, et cetera. Based on the completeness of the data or the time t of a specific request (e.g., failure probability at time t), a determination can be made at 206 as to whether data is missing from the dataset available to compute survival statistics related to one or more of the physical assets. If the determination at 206 returns positive, methodology 200 proceeds to 208 where fill data is calculated, projected, interpolated, et cetera. At 210, the fill data is provided to populate the dataset for calculation.

In embodiments, data may be summarized after aggregation at 204 and/or completion at 208 to reduce computational complexity or cost. Further, parameters may be determined or optimized prior to, during, or after development of hazard functions or survival functions as described herein.

After 208, or if the determination at 206 returns negative, methodology 200 proceeds to 212 where a model representing the data is generated. Generation of a model can include identification of parameters and relationships therebetween that relate the context around assets and their risk, survival, or performance. The parameters can be the most likely parameters based on analysis of the data. Analysis of the data to generate a model can utilize machine learning techniques. In embodiments, the model can be a convex latent variable model. In embodiments, there can be multiple instantiations of a model representing data, and one or more can be used during a given iteration of methodology 200.

In alternative embodiments, the model may be generated based on available data after 204 and used to fill missing data, if any. In such embodiments, the same model may be used for determining fill data and development of a hazard function, a model may be updated between filling data and generation of a hazard function, or a different model may be used for filling and creation of a hazard function.

Using the model created at 212, a hazard function is developed at 214. The hazard function can be developed by modeling the probability of a physical asset failing during a particular segment of time given its previous lifespan (based on its type and/or operational history including transients and degradation). The hazard function (or other aspects herein) can be developed through analysis of the data by, e.g., hazard module 124 or other systems, modules, components, routines, processes, et cetera.

Based on the hazard function, at 216 a survival function can be developed. The survival function can be developed to determine the probability that a physical asset remains in service for or until a segment of time (and/or operational history including transients or degradation). The survival function (or other aspects herein) can be developed through analysis of the data by survival module 126 or other systems, modules, components, routines, processes, et cetera.

Based on the survival and/or hazard function, at 218 variables (e.g., expected lifespan, survival probability, others) related to one or more physical assets can be calculated based on the unique parameters of that asset and/or variable including its base hazard, operational transients, and ongoing degradation or other conditions.

At 220, a determination is made as to whether to update one or more models based on new data received (e.g., in real-time) from sensors, other additional data received, validation or feedback on model performance (including calibration or accuracy analysis through validation), et cetera. In alternative embodiments, determinations regarding updates can be made at other times and/or made multiple times during a methodology or while performing techniques described herein. If the determination at 220 returns positive, methodology 200 can return to 204 (or any other aspect) at which data preparation or analysis can be repeated to update functions/models, or variable calculations. If the determination at 220 returns negative, methodology 200 can optionally proceed to 222 to recommend or cause action based on the determined variable(s) (e.g., remediation action) then proceed to end at 224, or repeat or initiate other aspects described herein.

While methodology 200 focuses on hazard and survival functions, it is understood other functions or models can be developed using methodology 200 or similar methodologies without departing from the scope or spirit of the disclosure.

Further aspects can be combined with or realized through system 100 and/or methodology 200. In embodiments, analytics module 122, methodology 200, or other aspects herein can include further aspects for tuning models based on precision or recall. In alternative or complementary embodiments, analytics module 122, methodology 200, or other aspects herein can include further aspects for determining or analyzing failure causes. In other alternative or complementary embodiments, analytics module 122, methodology 200, or other aspects herein can adjust models for "ground truths," real-world actions such as an unexpected failure or premature removal of a physical asset (e.g., occurring before modeled for removal; reality as opposed to calculation). In other alternative or complementary embodiments, analytics module 122, methodology 200, or other aspects herein can solve problems or functions based on economic priorities or others which relate to, but are not necessarily controlled by, hazard or survival.

While aspects herein may refer to particular types of physical assets (e.g., electrical grid assets such as transformers) or variables related thereto, it is understood that hazard and survival functions, or functions determining expectation of other parameters (e.g., capacity, cost, utilization, speed, routing) can be completed using techniques disclosed herein without departing from the scope or spirit of the innovation.

Figure 3:
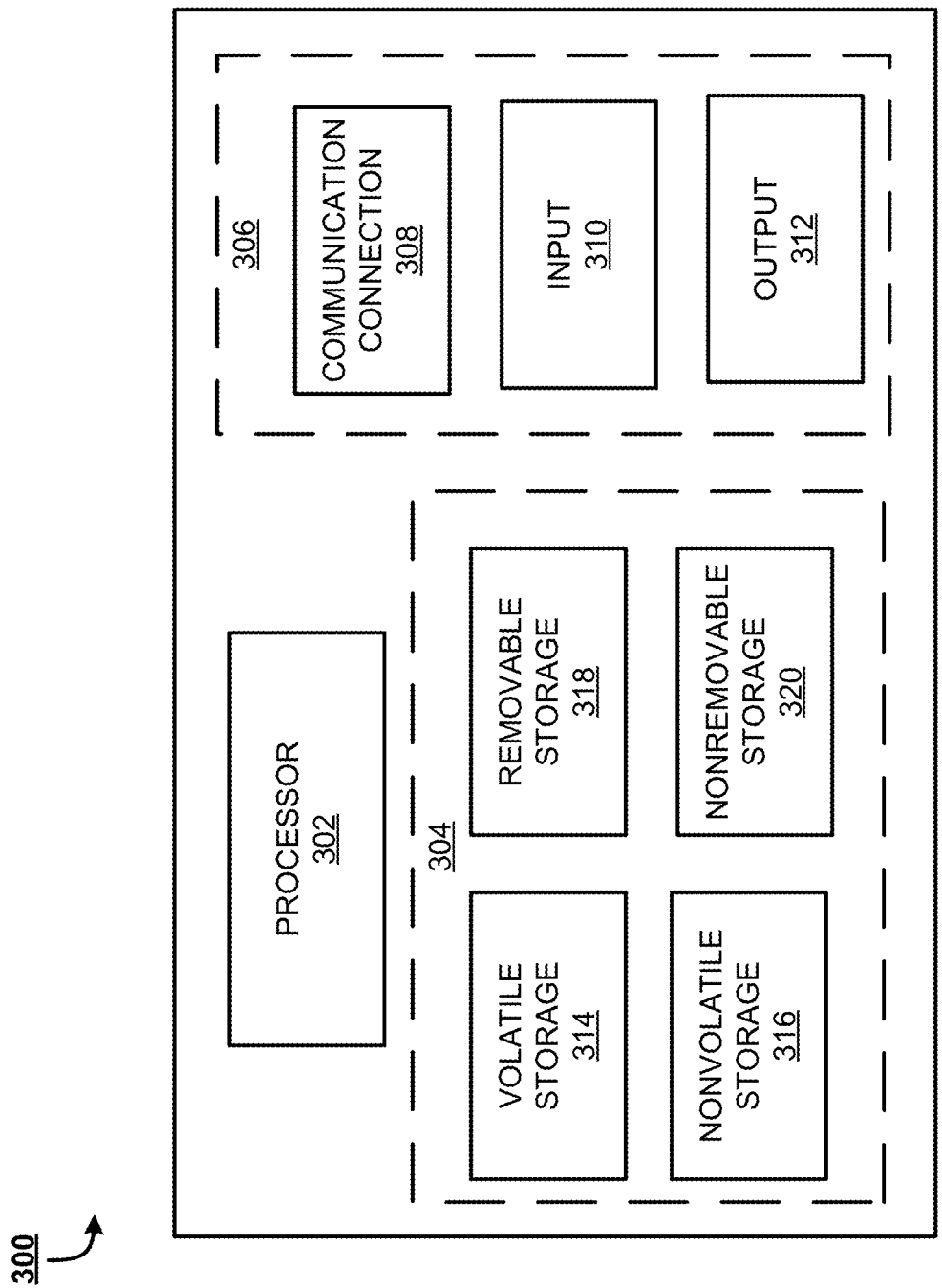
FIG. 3 is a block diagram illustrating an example implementation of a device which can be utilized in conjunction with or comprise a portion of systems disclosed.

FIG. 3 illustrates a device 300 which can embody or perform at least a portion of system 100 and/or methodology 200. Device 300 may comprise all or a part of modules or components herein. Device 300 may comprise hardware or a combination of hardware and software. The functionality to facilitate telecommunications via a telecommunications network may reside in one or combinations of links, portals, or connections. Device 300 depicted in FIG. 3 may represent or perform functionality of systems and methods disclosed herein, or combination of modules or components herein. It is emphasized that the block diagram depicted in FIG. 3 is an example and not intended to imply a limitation to a specific implementation or configuration. Thus, device 300 may be implemented in a single device or multiple devices. Multiple network entities may be distributed or centrally located. Multiple network entities may communicate wirelessly, via hard wire, or any appropriate combination thereof.

Device 300 may comprise a processor 302 and a memory 304 coupled to processor 302. Memory 304 may contain executable instructions that, when executed by processor 302, cause processor 302 to effectuate operations associated with aspects disclosed herein. As evident from the description herein, device 300 is not to be construed as software per se.

In addition to processor 302 and memory 304, device 300 may include an input/output system 306. Processor 302, memory 304, and input/output system 306 may be coupled together to allow communications there between. Each portion of device 300 may comprise circuitry for performing functions associated with each respective portion. Thus, each portion may comprise hardware, or a combination of hardware and software. Accordingly, each portion of device 300 is not to be construed as software per se. Input/output system 306 may be capable of receiving or providing information from or to a communications device or other network entities configured for telecommunications. For example input/output system 306 may include a wireless communications (e.g., WiFi/2.5G/3G/4G/5G/GPS) card. Input/output system 306 may be capable of receiving or sending video information, audio information, control information, image information, data, or any combination thereof. Input/output system 306 may be capable of transferring information with device 300. In various configurations, input/output system 306 may receive or provide information via any appropriate means, such as, for example, optical means (e.g., infrared), electromagnetic means (e.g., RF, WiFi, Bluetooth®, ZigBee®), acoustic means (e.g., speaker, microphone, ultrasonic receiver, ultrasonic transmitter), or a combination thereof. In an example configuration, input/output system 306 may comprise a WiFi finder, a two-way GPS chipset or equivalent, or the like, or a combination thereof.

Input/output system 306 of device 300 also may contain communication connection 308 that allows device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with aspects described herein. For example, processor 302 may be capable of, in conjunction with any other portion of device 300, modeling or calculation described herein.

Memory 304 of device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 300. Memory 304 may comprise executable instructions that, when executed by processor 302, cause processor 302 to effectuate operations for, e.g., modeling or calculation.

Figure 4:
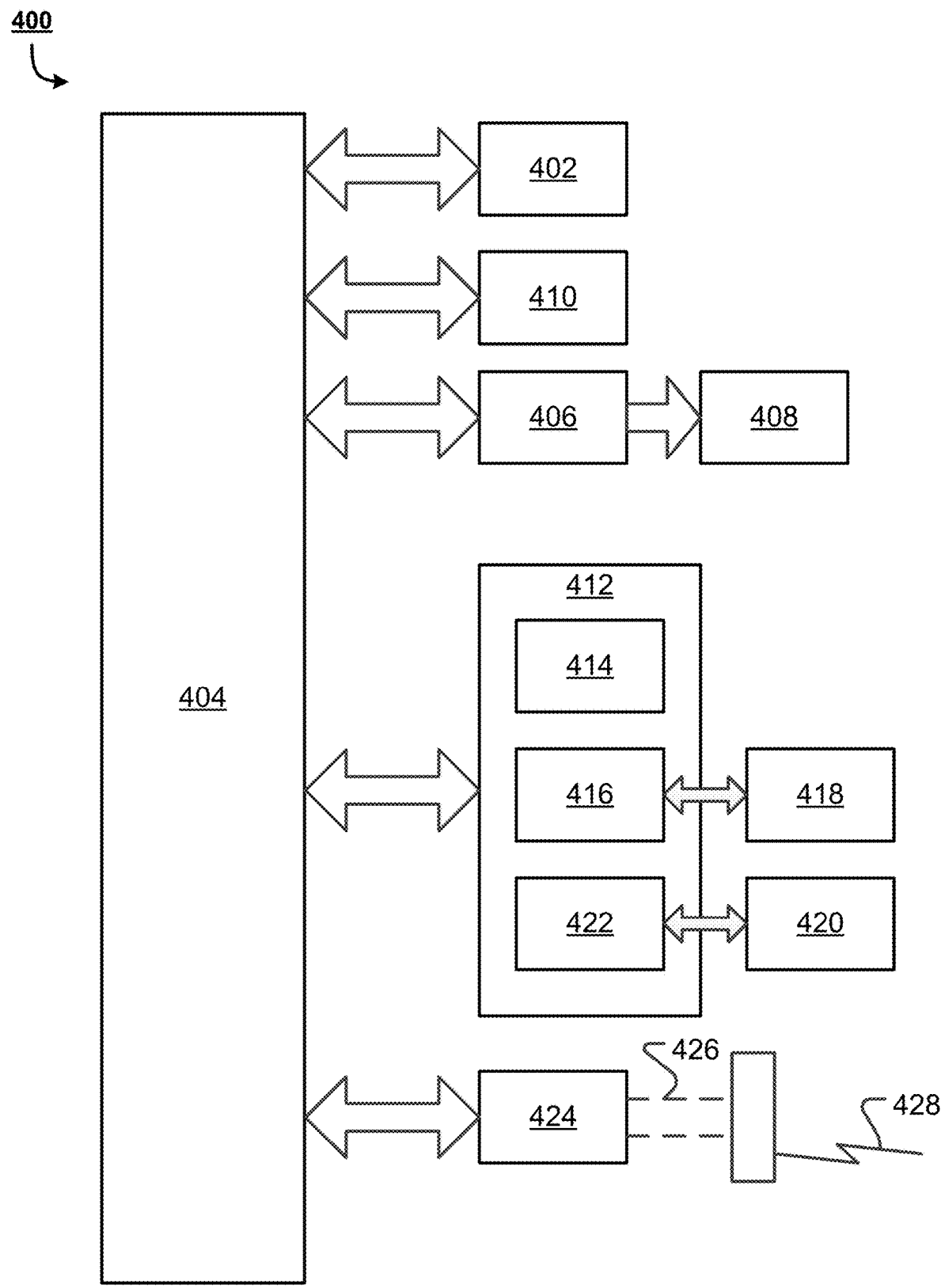
FIG. 4 is a block diagram of a computer system that be used to implement at least a portion of aspects herein.

FIG. 4 illustrates a computer-based system 400 that may constitute or include parts of one or more of aspects of, e.g., FIGS. 1 and/or 2, or device 300. Computer-based system 400 includes at least one processor, such as a processor 402. Processor 402 may be connected to a communication infrastructure 404, for example, a communications bus, a crossover bar, a network, or the like. Various software aspects are described in terms of this example computer-based system 400. Upon perusal of the present description, it will become apparent to a person skilled in the relevant art(s) how to implement the present disclosure using other computer systems or architectures.

Computer-based system 400 includes a display interface 406 that forwards graphics, text, or other data from communication infrastructure 404 or from a frame buffer for display on a display unit 408.

Computer-based system 400 further includes a main memory 410, such as random access memory (RAM), and may also include a secondary memory 412. Secondary memory 412 may further include, for example, a hard disk drive 414 or a removable storage drive 416, representing a floppy disk drive, a magnetic tape drive, an optical disk drive, etc. Removable storage drive 416 reads from or writes to a removable storage unit 418 in a well-known manner. Removable storage unit 418 may represent a floppy disk, magnetic tape, or an optical disk, and may be read by and written to by removable storage drive 416. As will be appreciated, removable storage unit 418 includes a computer usable storage medium having computer software or data stored therein.

In accordance with various aspects of the present disclosure, secondary memory 412 may include other similar devices for allowing computer programs or other instructions to be loaded into computer-based system 400. Such devices may include, for example, a removable storage unit 420 and an interface 422. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 420 to computer-based system 400.

Computer-based system 400 may further include communication interface 424. Communication interface 424 may allow software or data to be transferred between computer-based system 400 and external devices. Examples of communication interface 424 include, but may not be limited to a modem, a network interface (such as an Ethernet card), a communications port, a Personal Computer Memory Card International Association (PCMCIA) slot and card, or the like. Software or data transferred via communication interface 424 may be in the form of a number of signals, hereinafter referred to as signals 426, which may be electronic, electromagnetic, optical or other signals capable of being received by communication interface 424. Signals 426 may be provided to communication interface 424 via a communication path (e.g., channel) 428. Communication path 428 carries signals 426 and may be implemented using wire or cable, fiber optics, a telephone line, a cellular link, a radio frequency (RF) link, or other communication channels.

In this document, the terms "computer program medium," "computer usable medium," "computer-readable medium," et cetera, are used to generally refer to media such as removable storage drive 416, a hard disk installed in hard disk drive 414, or various other memory/storage elements. These computer program products provide software to computer-based system 400. The present disclosure is directed to such computer program products.

Computer programs (also referred to as computer control logic) may be stored in main memory 410 or secondary memory 412. The computer programs may also be received via communication interface 404. Such computer programs, when executed, enable computer-based system 400 to perform the functions consistent with the present disclosure, as discussed herein. In particular, the computer programs, when executed, enable processor 402 to perform the features of the present disclosure. Accordingly, such computer programs represent controllers of computer-based system 400.

In accordance with an aspect of the present disclosure, where the disclosure is implemented using a software, the software may be stored in a computer program product and loaded into computer-based system 400 using removable storage drive 416, hard disk drive 414, or communication interface 424. The control logic (software), when executed by processor 402, causes processor 402 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

As noted herein, modeling to determine survival and/or physical asset variable calculations, or expectations based thereon, support a variety of use cases across a wide range of physical assets which can be monitored by sensor or otherwise analyzed according to receivable data. Providing a non-limiting example, systems and methods disclosed herein like system 100 and methodology 200 were applied to a use case for an electrical utility operating approximately 27,000 network transformers throughout its service territory. These network transformers were responsible for delivering reliable power to over three million customers in the territory. A remote monitoring system utilizing sensors and network communication was deployed to capture sensor data from a subset of the fleet for which the entire lifetime was observed. Data monitored for the transformers included (but was not limited to) loading, main tank pressure, temperature, and oil level. Applying the techniques herein, analysis included a sample of physical assets for which the installation and failure time of the asset was observed and for which remote monitoring system (RMS) data was available.

Based on the data collected, probabilities for physical asset failure related to the transformers were calculated for each based on fleet data and individual operating data and condition. Models were used to develop hazard and survival functions of each asset to reduce in-service failures, enhance field force productivity, and augment procurement decisions.

The convex latent variable model was shown applicable based on analysis of the RMS data. Observations were recorded at the example interval of approximately ten minutes and included (but was not limited to) variable data such as physical asset load, voltage, oil level, and temperature. In embodiments of the example application, summary data was extracted from the raw RMS data, calculated at a twelve-hour interval, to reduce computing cost. The extracted features capture information such as raw variable means, medians, and correlations within the twelve-hour interval.

Figure 5A:
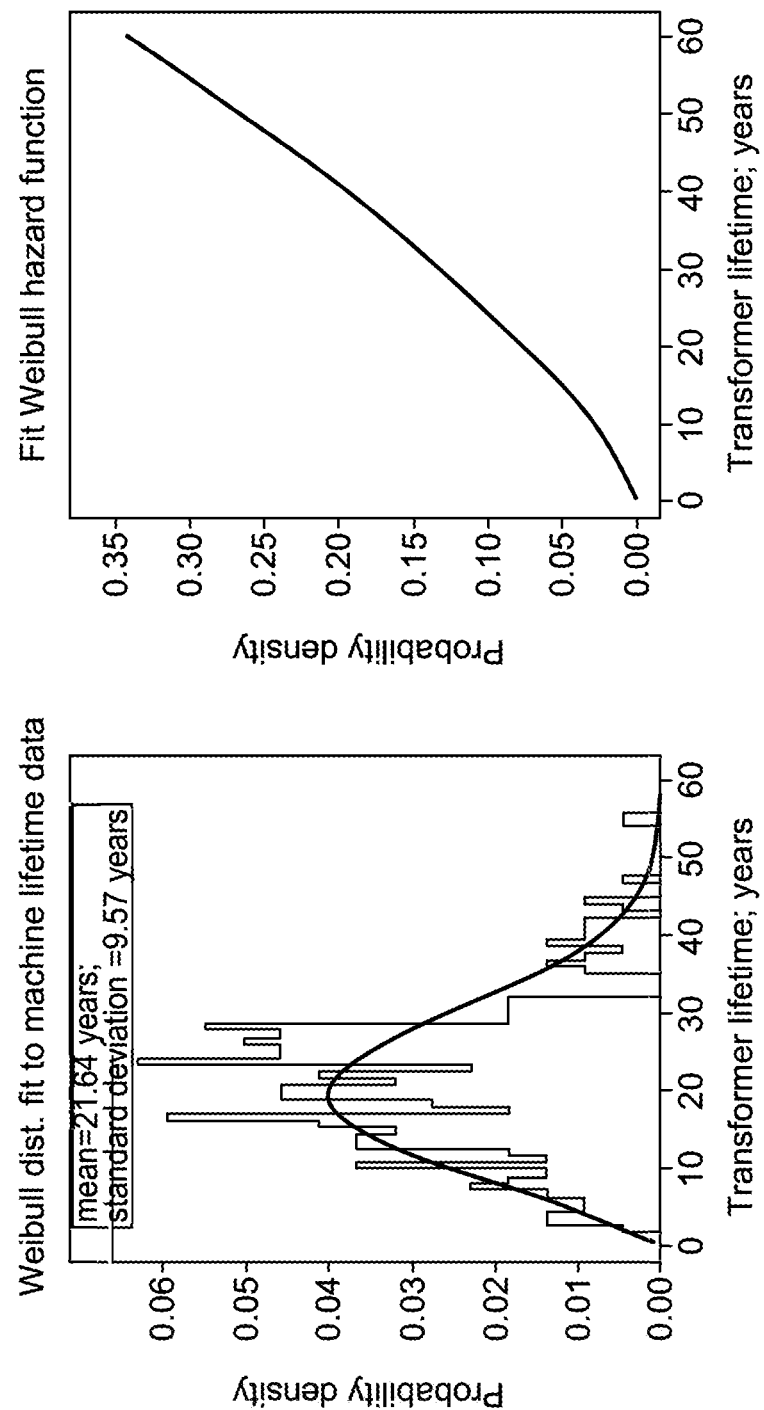
FIG. 5A, FIG. 5B, FIG. 5C, FIG. 5D, and FIG. 5E illustrate example data presentation or user interface elements as disclosed herein.

Based on this transformer example, FIGS. 5A, 5B, 5C, 5D, and 5E illustrate example data presentation or user interface elements as disclosed herein. FIG. 5A illustrates estimated base hazard rate from observed physical asset lifetimes using a Weibull distribution.

To construct a convex latent variable model, techniques used in this example calculate the base hazard rate $\lambda_0$ which captures average failure risk as a function of physical asset age across the fleet. The base hazard rate can be obtained by, e.g., fitting a parametric Weibull model using maximum likelihood estimation as shown in FIG. 5A. As the drawing shows, this model fit corresponds to a monotonically increasing hazard function, consistent with failure probability increasing with physical asset age. The probability density on the vertical axis represents the predicted probability of physical asset failure for any given lifetime between zero and 60 years.

As described herein, RMS data is often incomplete, due in part to the relatively recent introduction of the capability into the fleet. Therefore, many instances of missing data result when aggregating raw data into twelve-hour intervals via feature extraction. Embodiments disclosed herein standardize the time series covariates by subtracting the mean and dividing by the standard deviation of each variable. Alternatively, an absolute deviation or other measure of variance can be utilized. Missing data can be filled with zero values, which can correspond to the mean in the newly standardized data. Filling missing values with the mean is roughly equivalent to assuming steady state machine operation. Other techniques can be utilized to build on this assumption. For example, the desired "fill" value(s) could be added as a parameter to the model, allowing the model to seek values that best model where a gap in the data exists, thereby adding values with a highest likelihood of accurately representing the patterns of the sensor data.

Parameters of the convex latent variable model can be optimized. Example optimization algorithms used in this fashion include, e.g., the limited-memory Broyden-Fletcher-Goldfarb-Shanno B (L-BFGS-B) algorithm to maximize likelihood.

An unconventional benefit of the convex latent variable model is that the likelihood function can be computed as a function of the observed data, meaning that "standard" optimization techniques can be applied to find the values of $\theta_0$, $\theta_1$, and $\theta_2$. In this sense, it is unconventional to be able to use "standard" optimization techniques. Typically, custom optimization techniques must be implemented based on the use case, which requires significant labor to develop and code. However, by encoding models to a specification compliant with a variety of standard optimization techniques, the labor associated with optimization can be reduced by obviating the need to for at least a portion of customized use-case coding. This provides fast and flexible solutions to users who can implement optimization according to their preferences or resources. In embodiments, L2 regularization can be performed during the optimization process to prevent overfitting. Regularization provides a manner to penalize complex models and increase generalization performance on unseen data.

Figure 5B:
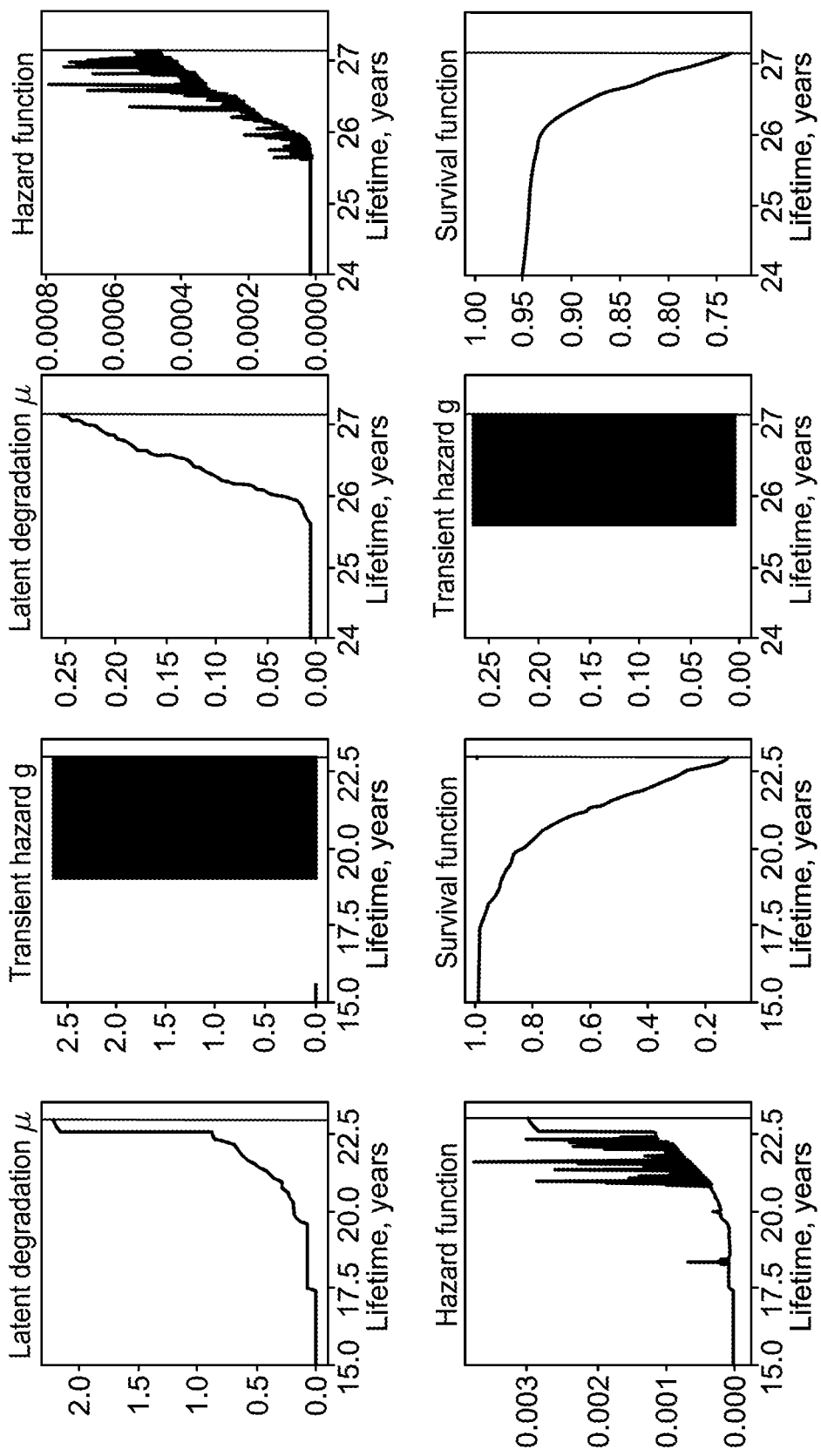

FIG. 5B illustrates components $\mu$ (latent degradation) and g (transient hazard) of estimated hazard function and corresponding survival function for two physical assets in the validation set.

While maximum likelihood is a method to determine the values (optimal or otherwise) of the parameters of the model, a competing goal can be to achieve high accuracy when calculating expectations for remaining useful life and failure probabilities. Metrics can be selected based on considerations for prioritizing maintenance and minimizing in-service failure rates (e.g., remediation module 128). After fitting the model on observed training data, these metrics can be calculated on held-out validation data to generate an unbiased measure of model performance (e.g., validation module 134).

As illustrated in this disclosure, models herein can identify subtle signals indicating proximity to failure, using only RMS data up until the current period. This enables real-time renderings of the hazard and survival functions, determined and updated as frequently as supporting systems permit. Embodiments herein provide such a method to predict failure at various horizons (e.g., one- and two-year horizons). In embodiments, inputs and outputs related to a model are utilized to calculate hazard and survival functions, or projections of hazard, survival, or related values in real-time as sensor measurement data is fed through an existing model. In such embodiments, the model may remain the same while processing real-time data. In alternative or complementary embodiments, the model itself can be updated periodically or continuously based on enlarged sets of training data.

Evaluation of model accuracy is summarized through precision, the percent or ratio of predicted failures that actually resulted in failures, and recall, the percent or ratio of actual failures that were correctly predicted. The model allows tuning (e.g., by machine learning, by the system, by the user) of the failure prediction framework to particular specifications, based on relative aversion to false positives (i.e., when failure is predicted by the model, but no failure occurs) and false negatives (i.e., a failure occurs, but was not predicted by the model).

In the example, after training the model on historical physical asset records, its performance was validated on test transformers. By plotting the hazard and survival functions for the test physical assets, model outputs demonstrate clear patterns in the data indicating an upcoming failure. These are reflected intuitively as a sharp drop in the corresponding survival function. To determine levels of confidence, precision (e.g., proportion of relevant instances among retrieved instances) and recall (e.g., of relevant instances that have been retrieved over the total amount of relevant instances) can be calculated at various horizons in the non-limiting example. For a one-year horizon, precision was approximately 0.73 and recall was approximately 0.40; for a two-year horizon, precision was approximately 0.57 and recall was approximately 0.65. Alternative embodiments can achieve greater precision and recall, and may achieve perfect or near-perfect precision or recall, one horizons of one year, two years, or longer.

Figure 5C:
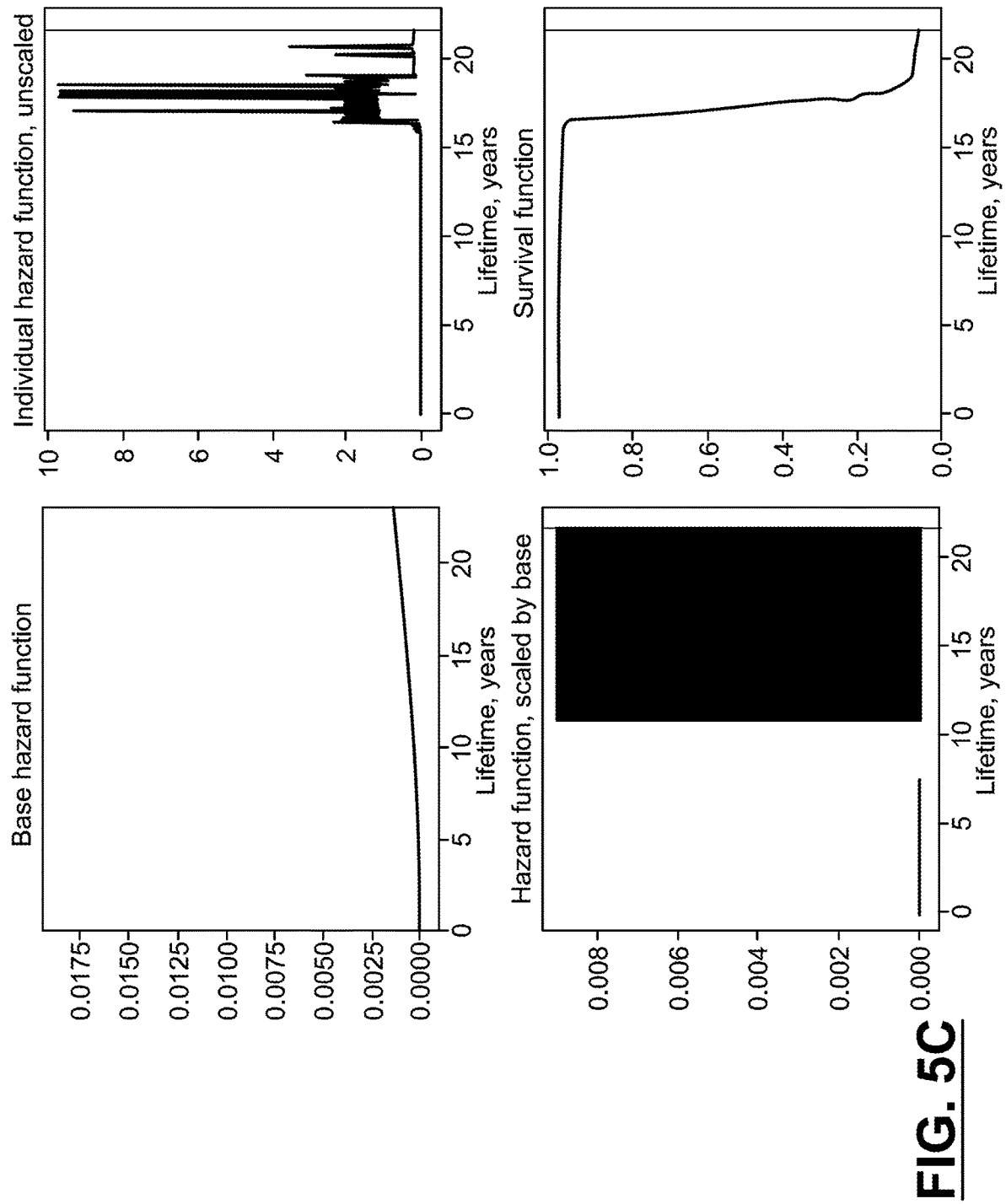

FIG. 5C illustrates, for the example, estimation of the survival function by multiplying base hazard and individual base hazard for an example physical asset in the validation set.

As described herein, the convex latent variable model consists of both a degradation term $\mu$ and a transient hazard term g. The sum of these components, together with the base hazard, provides an embodiment of a hazard function (probability of failure at each time t, given that failure has not yet occurred) from which the survival function (probability of the physical asset remaining in service given that it has lived until time t) can be derived. FIG. 5B illustrates the components of the hazard function and how they inform both the hazard and the survival function. The plots of $\mu$, g, the hazard function, and the survival function are shown for two physical assets in the validation set. For both of these physical assets, there is a significant disturbance in the hazard function during the last two years of their operation, suggesting an imminent in-service failure.

Once the physical asset-specific hazard function is constructed from the latent degradation term and the transient hazard term, it is multiplied by the base hazard rate as described herein and shown in, e.g., FIG. 5A. This ensures the hazard function increases over time, even during periods with missing RMS data. FIG. 5C shows this process for a physical asset in the validation set. This physical asset showed signs of increasing failure potential almost five years before it failed in-service.

Figure 5D:
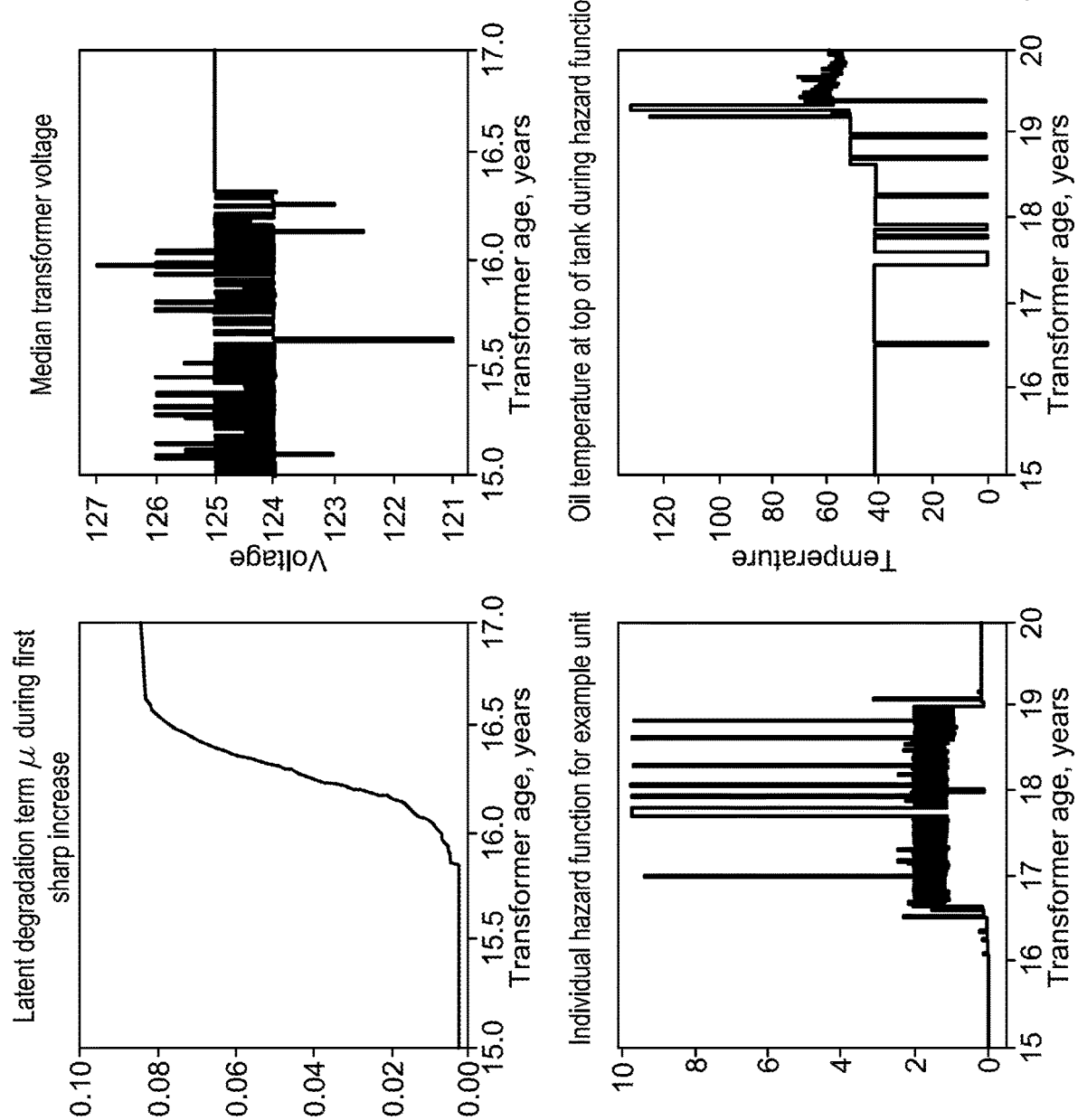

For an engineer or maintenance worker, it would be beneficial to understand the underlying causes of failure. To this end, aspects herein (e.g., analytics module 122, methodology 200, other aspects) can identify features or parameters assuming or moving toward unusual values (e.g., at least two standard deviations from the mean) during and/or before the period when the hazard function and the degradation function $\mu$ first increased dramatically. Further, embodiments can identify certain variables (including or from sensor data and derived values) having the largest impact on the hazard, which can be ranked or ordered in a manner informing which measurements or circumstances have the largest impact on an asset's remaining life or performance. The top panel of FIG. 5D shows the individual hazard function for a validation physical asset along with several of the variables that were unusually high during the period when the individual hazard function began to spike. The bottom panel shows an analogous plot for the degradation function associated with the same physical asset, which begins to increase before any significant change in the hazard function occurs.

FIG. 5D depicts, for the example, plots of time series covariates with unusually large deviations from the mean during large spikes in the hazard function (bottom left) and the latent degradation term (top left) for an example validation transformer. Unusual fluctuations of voltage (top right) accompany the first large increase in the degradation component $\mu$. In contrast, the spikes in the overall hazard function are accompanied by irregular values of physical asset temperature measured at the top of the tank (bottom right). It appears that unusual covariate values are manifested first through the degradation term $\mu$ before being accounted for by the transient hazard term g and the overall hazard function.

The signs of increasing failure probability are manifest in the hazard and survival functions. Training data is used by systems and methods herein to compute estimated failure probabilities at both the one- and two-year horizon, compared it to the ground truth (i.e., whether the physical asset was in fact removed before the query date) and chose the classification threshold that minimized the number of incorrectly classified physical assets. Systems and methods herein can compute one- and two-year failure probabilities on the physical assets in the validation set and used the threshold from training to implement the classification rule as would have to be done in practice for machines that have not yet failed.

Figure 5E:
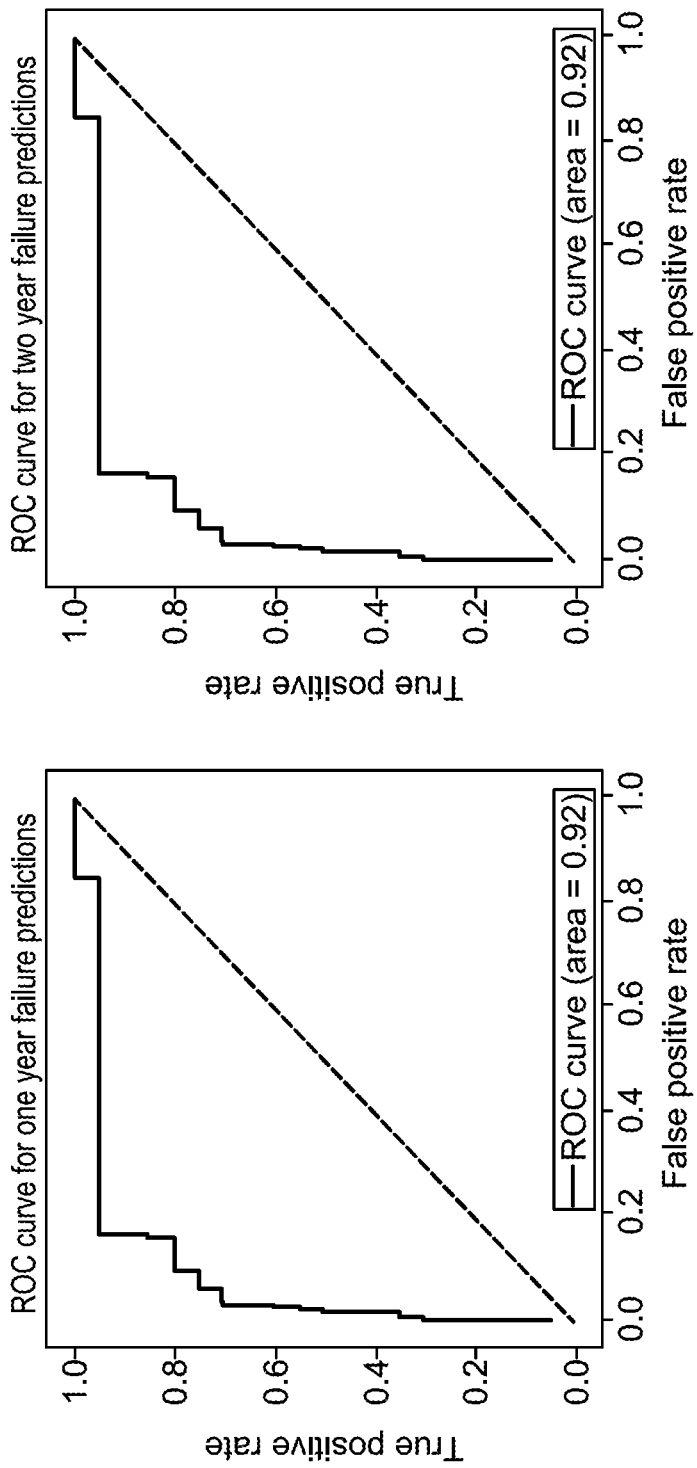

FIG. 5E shows, for the example, the receiver operating characteristic (ROC) curves of failure predictions at both a one- and two-year horizon. The curves illustrate the tradeoff between false positives at the expense of increasing and false negatives. A perfect classifier achieves an AUC score (area under the ROC curve) of 1. In the example, both the classifiers achieve scores of 0.92 on the validation data. This score is for example purposes only, and can vary in alternative embodiments or given different data, and can be higher or lower without departing from the scope or spirit of the innovation.

Through this example, systems and methods utilizing the convex latent variable model are shown to yield unconventional solutions for a problem not well understood given the pace of technology in terms of physical assets, monitoring capability, and analytical resources.

The solution applied required first extracting time series features from the observed data and accounting for missing data. The parameters of the model were optimized using a set of physical assets and the performance was evaluated on another set validation physical assets. Graphical representations of the hazard and survival function for many of the test physical assets reveal periods of high physical asset stress that anticipate failures before they occur. This preemptive signal of impending failure can be used by systems and methods disclosed herein to develop a failure prediction model at both a one- and two-year time horizon. Precision and recall of the model can be calculated, and evolve with more training data, which can be received continuously. Additionally, incorporating physical asset static data can further improve estimated variables related to a given physical asset.

While the example given is directed to a network of transformers, the techniques disclosed herein are broadly applicable and can be used with other asset classes in the same electrical grid (e.g. circuit breakers, substation physical assets). Use cases beyond the electrical grid are myriad, but include all other utilities and business arrangements utilizing fleets of physical assets. Specific examples can include reverse osmosis systems, telecommunications networks, gas and water utilities, public or fleet transportation, logistics networks, building operations equipment (e.g., boilers, filters, heating, air conditioning), battery systems, power generation systems, et cetera. Further, techniques described herein can be used to model other time-to-event technique where time series data and event data are available.

While particular use cases are provided, various aspects disclosed herein are to be taken in the illustrative and explanatory sense, and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

Software elements disclosed or described herein may be loaded onto a general-purpose computer, special-purpose computer, or other programmable data processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows or may be expanded for the sake of simplicity. In other cases, steps illustrated and described as single process steps may be separated into multiple web pages and/or windows but may be combined for simplicity.

The systems, methods and computer program products disclosed in conjunction with various aspects of the present disclosure are embodied in systems and methods for facilitating multiple types of communications in systems and networks discussed herein.

Methodologies herein are described with specific aspects for ease of explanation with respect to various embodiments. However, methodologies embraced under the scope and spirit of the disclosure may vary, to include excluding particular aspects or comparisons described.

While aspects of the present disclosure have been particularly shown and described with reference to the examples above, it will be understood by those skilled in the art that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof

What is claimed is:

1. A method, comprising:
   accessing sensor data related to a plurality of physical assets;
   generating a hazard function associated with at least one of the plurality of physical assets based on the sensor data;
   generating a survival function based on the hazard function, wherein the survival function is a convex latent variable model; and
   calculating a variable associated with the at least one of the plurality of physical assets based on the survival function.

2. The method of claim 1, further comprising:
   determining a transient condition associated with the at least one of the plurality of physical assets from the sensor data,
   wherein the hazard function is based on the transient condition.

3. The method of claim 1, further comprising:
   determining a degradation condition associated with the at least one of the plurality of physical assets from the sensor data,
   wherein the variable is based on the degradation condition.

4. The method of claim 1, further comprising:
collecting the sensor data using one or more sensors associated with one or more of the plurality of physical assets.

5. The method of claim 1, further comprising:
aggregating the sensor data before one or both of generating the survival function or calculating the variable.

6. The method of claim 1, further comprising:
supplementing the sensor data to provide for missing data by calculating a fixed value based on an average of the sensor data.

7. The method of claim 1, further comprising:
standardizing a sensor variable of the sensor data by subtracting a mean of the sensor variable and dividing by a measure of variance of the sensor variable.

8. The method of claim 7, wherein standardizing the variable occurs before generating the hazard function.

9. The method of claim 1, further comprising:
updating one of the survival function and the variable based on additional sensor data received in real-time.

10. The method of claim 1, further comprising:
calculating one or more of a precision and a recall associated with the survival function.

11. The method of claim 10, further comprising:
tuning the survival function based on one or more of the precision or the recall.

12. The method of claim 10, further comprising:
generating one or more of a priority list or a maintenance schedule associated one or more of the plurality of physical assets based on one or more of the precision or the recall and cost information.

13. The method of claim 1, further comprising:
determining an event associated with the variable;
analyzing one or more changes to parameters associated with the plurality of physical assets; and
determining a cause of the event based on the changes to the parameters.

14. A system, comprising:
a hazard module configured to generate a hazard function associated with physical assets based on sensor data from the physical assets;
a survival module configured to generate a survival function based on the hazard function, wherein the survival function is convex latent variable model; and
an analytics module configured to calculate a variable associated with at least one of the physical assets based on the survival function.

15. The system of claim 14, further comprising:
a remediation module configured to determine an action to constrain a cost based on the variable.

16. The system of claim 14, further comprising:
a component module configured to update the hazard module based on one or more of a degradation component or a transient component, wherein the degradation component or the transient component describe hazard to the physical assets.

17. The system of claim 14, further comprising:
a projection module configured to project an unknown past value of the variable based on a fixed value, wherein the fixed value is based on an average of known past values.

18. The system of claim 14, further comprising:
a validation module configured to validate one of the hazard function or the survival function using partitioned sensor data associated with the physical assets, wherein the partitioned sensor data is not included in the sensor data.

19. The system of claim 14, wherein the hazard module is configured to:
receive additional sensor data in real-time; and
update the hazard function based on the additional sensor data.

20. A non-transitory computer-readable medium storing instructions that when executed by a processor effectuate operations comprising:
accessing sensor data related to at least one physical asset;
generating a hazard function associated with the at least one physical asset based on the sensor data;
generating a survival function associated with the at least one physical asset based on the hazard function, wherein the survival function is a convex latent variable model; and
calculating a variable associated with the at least one physical asset based on the survival function.

* * * * *